United States Patent [19]

Komatsu

[11] Patent Number: 4,734,806
[45] Date of Patent: Mar. 29, 1988

[54] CAM PLATE FOR POSITIONING HEAD BASE AND PINCH ROLLER IN TAPE PLAYER

[75] Inventor: Norimasa Komatsu, Kakuda, Japan

[73] Assignee: Alps Electric Co., Ltd., Japan

[21] Appl. No.: 852,428

[22] Filed: Apr. 16, 1986

[30] Foreign Application Priority Data

Apr. 16, 1985 [JP] Japan ............................. 60-54633[U]

[51] Int. Cl.$^4$ .......................... G11B 5/54; G11B 21/22
[52] U.S. Cl. .................................. 360/105; 360/96.4; 360/83
[58] Field of Search ............................. 360/96.1–96.6, 360/105, 93, 106, 107, 90, 83

[56] References Cited

U.S. PATENT DOCUMENTS

| | | | |
|---|---|---|---|
| 3,759,529 | 9/1973 | Yoshii | 360/96 |
| 4,399,475 | 8/1983 | Shimomae | 360/105 |
| 4,470,087 | 9/1984 | Sakamoto et al. | 360/105 X |
| 4,504,877 | 3/1985 | Tsuchiya | 360/96.2 X |

FOREIGN PATENT DOCUMENTS

| | | | |
|---|---|---|---|
| 58-169369 | 10/1983 | Japan | 360/105 |
| 2125608 | 3/1984 | United Kingdom | 360/105 |

Primary Examiner—Stuart N. Hecker
Assistant Examiner—Alfonso Garcia
Attorney, Agent, or Firm—Guy W. Shoup

[57] ABSTRACT

A small-sized, multifunctioned micro cassette tape player has one motor and one solenoid and a drive plate connected to the solenoid for moving a head base and a pinch roller between engaged and retracted positions. The tape player has a cam mechanism which includes a cam plate having a stopper portion for engaging a control pin on the drive plate to hold the drive plate at an intermediate retracted position from the engaged position, when the solenoid is deenergized for the first time after being energized, for high speed cue, review, and erasure operations. The cam plate also has a displaceable guide portion for allowing the control pin to pass and the drive plate to return to the fully retracted position when the solenoid is again energized and deenergized.

4 Claims, 10 Drawing Figures

CAM PLATE FOR POSITIONING HEAD BASE AND PINCH ROLLER IN TAPE PLAYER

BACKGROUND OF THE INVENTION

Field of the Invention

The present invention relates to a small-sized tape player for operating a magnetic head and a pinch roller by the attraction of a solenoid and, more particularly, to a tape player which is enabled to perform not only the playing (or recording) operation and the stopping operation but also the cue or review operation by the drive of the single solenoid.

Description of the Prior Art

In recent years, there has been developed a small-sized and simplified tape player as one for playing (or recording) a micro cassette tape.

One of the tape players of this kind is equipped with one motor and one solenoid as a drive source. In this tape player, reel bases for winding the tape are rotationally driven by the single motor, and a pinch roller and a magnetic head are adapted to be brought into and out of the positions to face the tape by the action of the solenoid. When the solenoid is energized for its attraction, more specifically, the pinch roller P is brought into contact with a capstan 1 rotating at a constant speed, as shown in FIG. 4, so that the tape held inbetween is fed at the constant speed, and at the same time a magnetic head H is moved forward to contact with the tape thereby to accomplish the playing or recording operation. When the solenoid is deenergized and released from its attraction, on the contrary, a head base 2 is retracted by the force of a spring or the like so that the pinch roller P and the magnetic head H are completely disengaged from the tape If the motor is turned at a high speed to rotate the reel bases when both the pinch roller P and the magnetic head H come apart from the tape, the fast forwarding and rewinding operations of the tape are conducted. By switching the energization and deenergization of the solenoid in that way, the four modes of playing, recording, fast forwarding and rewinding can be selected.

In addition to the above-specified four operation modes, incidentally, the functions of the tape player may require the cue and review modes and further the fast erasing mode. In order to realize these three additional operation modes, as shown in FIG. 5, the head base is slightly retracted to the position where the pinch roller P is slightly apart from the capstan 1 and where the magnetic head H is in light contact with the tape. In this state, the reel bases are rotated at a high speed to forward the tape fast (for the cue operation) or to rewind the same (for the review operation) to read the recording tape. If the erasure is conducted by the magnetic head H in the state of FIG. 5, on the other hand, it can be done at high speed.

In the case of the mechanism in which the head base 2 is driven by the attraction of the single solenoid to move the pinch roller P and the magnetic head H, however, it is impossible to stop the head base 2 temporarily at the position of the intermediate operation mode shown in FIG. 5. This makes it necessary to add another solenoid for switching the operation to the cue and review operation modes shown in FIG. 5 so that the tape player has its construction complicated and its production cost raised. It would completely obstruct the size reduction of the single-motor and -solenoid tape recorder especially for the micro cassette to add another solenoid to the tape recorder.

SUMMARY OF THE INVENTION

The present invention has been conceived to solve the above-specified problems of the prior art and has an object to provide a tape player which is enabled to perform the cue, review and fast erasing operations in addition to the playing (or recording) and stopping operations and to have its size reduced, while being freed from any complicated construction, by the simple attraction and non-attraction of a single solenoid.

According to the present invention, there is provided a tape player comprising: a chassis; a capstan supported rotatably on said chassis; a pair of reel bases mounted rotatably on said chassis and adapted to wind a tape of a tape cassette; a prime mover for rotationally driving said capstan and said reel bases for winding up the tape onto one of said reel bases from the other; a head base supported slidably on said chassis; a magnetic head fixedly carried on said head base and adapted to come toward and away from a first position where it contacts with the tape being wound up; a pinch roller adapted to come toward and away from a second position where it contacts with said capstan feed the tape being wound up; a drive plate supported slidably on said chassis for bringing said magnetic head and said pinch roller toward and away from the respective first and second positions thereof; a solenoid connected to said drive plate for moving, when energized, said drive plate to bring said pinch roller into said second position and said magnetic head into said first position; and bias means for biasing said drive plate away from said solenoid to bring said pinch roller and said magnetic head, when released from the solenoid, out of the respective first and second positions thereof, wherein the improvement comprises a cam mechanism including: a cam plate having a stopper portion for retracting said drive plate, until said magnetic head comes into said first position and said pinch roller leaves said second position, to stop the same when said solenoid comes once into and then out of its attracting state, and a guide portion for returning said drive plate to bring said magnetic head and said pinch roller away from the respective first and second positions thereof, when said solenoid comes into and then out of its attracting state once said drive plate is stopped by said stopper portion; and control means for controlling said cam plate to cause the retracting action of said stopper portion and the returning action of said guide portion. Thus, by interposing the cam mechanism composed of the cam plate and the projections, it is made possible to realize the switching operation to not only the playing and stopping operation modes but also the cue, review and fast erasing operation modes merely by the attraction of the single solenoid.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENT

Figure 1:
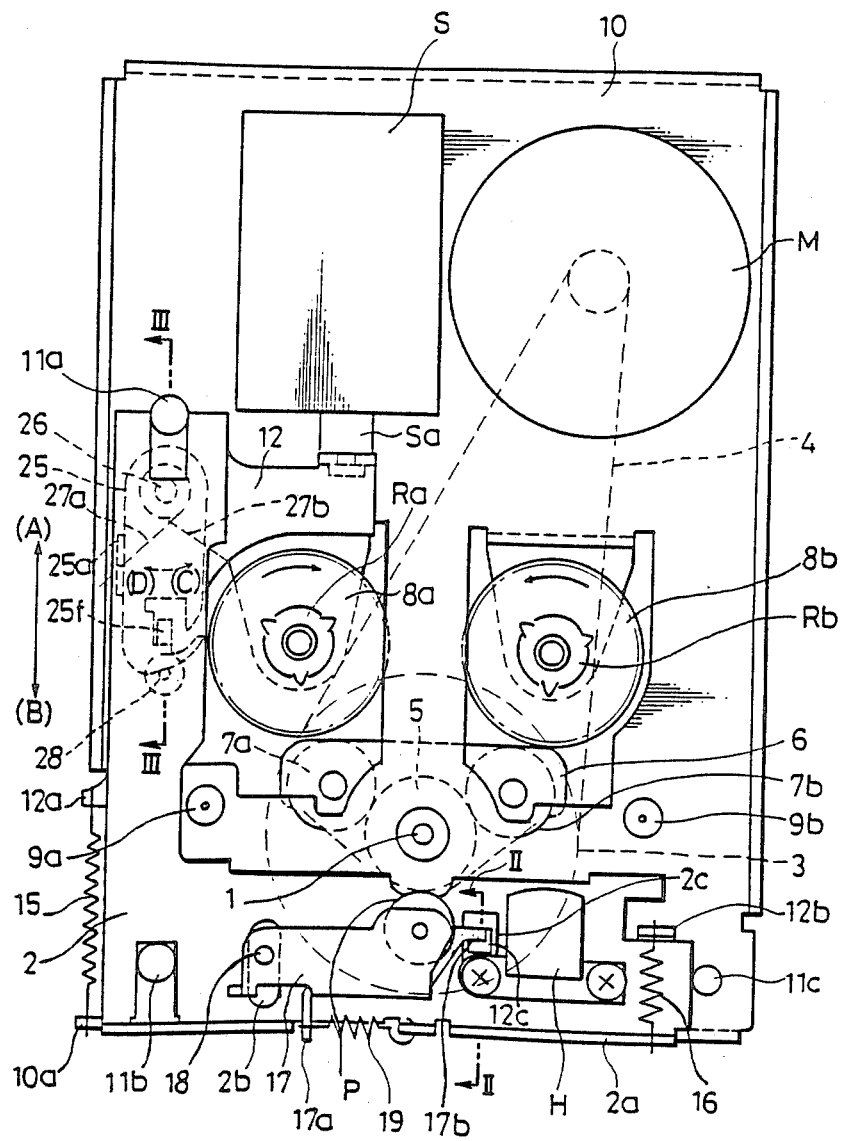
FIG. 1 is a top plan view showing the overall construction of the tape player.

The tape player according to the present invention is intended to drive a micro cassette tape. A chassis 10 is equipped thereon with one motor M and one solenoid S.

A capstan 1 is supported rotatably on the chassis 10. This chassis 10 is further equipped on its back side with a flywheel 3 which is made integral with the capstan 1. This flywheel 3 and the motor M have their shafts connected by means of a belt 4. On the capstan 1, on the other hand, there is mounted a drive gear 5 such that it may be rotated together with the former. There is also provided a bracket 6 which can rock back and forth on the capstan 1. The bracket 6 is equipped at both its ends with idle gears 7a and 7b. These two idle gears 7a and 7b are in meshing engagement with the aforementioned drive gear 5.

On the chassis 10, there are rotatably mounted a pair of reel bases Ra and Rb. Of these, the lefthand reel base Ra is located at the take-up side whereas the righthand reel base Rb is located at the let-off side. The reel base Ra is equipped at its base with a follower gear 8a through a slip mechanism (although not shown), and the other reel base Rb is equipped at its base with a follower gear 8b through a slip mechanism (although not shown). The aforementioned idle gear 7a is positioned to face the follower gear 8a whereas the other idle gear 7b is positioned to face the follower gear 8b. When the flywheel 3 and the capstan 1 are rotated clockwise by the motor M, the bracket 6 is returned in the same direction to bring the idle gear 7a into meshing engagement with the follower gear 8a so that the drive power is transmitted to the follower gear 8a to rotate the reel base Ra clockwise. When the motor M is rotated counter-clockwise, on the contrary, the bracket 6 is turned in the same direction to bring the idle gear 7b into meshing engagement with the follower gear 8b so that the reel base Rb is rotated counter-clockwise.

The chassis 10 is equipped thereon with a pair of positioning pins 9a and 9b. The micro cassette (although not shown) are positioned by those pins 9a and 9b and are loaded onto the reel bases Ra and Rb and the capstan 1.

The chassis 1 is equipped thereon with three guide pins 11a, 11b and 11c, by which a drive plate 12 and a head base 2 are supported in a manner to slide freely in the directions (A)-(B) of FIG. 1. The head base 2 and the drive plate 12 are made to have similar shapes and are attached, as shown in their respective sections in FIGS. 2 and 3, such that the head base 2 is overlaid on the drive plate 12 and such that they are allowed to slide separately of each other.

The upper end of the drive plate 12 is connected to the plunger Sa of the solenoid S. On the other hand, the drive plate 12 is formed at its left end with a spring hook 12a. Between this spring hook 12a and the projection 10a formed at the lower left end of the chassis 10, there is mounted a return spring 15. By the elastic force of this return spring 15, the drive plate 12 is biased in the direction of the arrow (B). On the other hand, the drive plate 12 is bent at its right end portion with a retaining portion 12b, which is retained by the front side of the right end of the head base 2. As a result, when the drive plate 12 is returned in the direction (B) by the aforementioned return spring 15, the retaining portion 12b pushes back the head base 2 in the direction (B). Between the aforementioned retaining portion 12b and the bent portion 2a formed at the end portion of the head base 2, there is mounted a connecting spring 16, through which the head base 2 is pulled in the direction (A) when the drive plate 12 is pulled in the direction (A) by the solenoid S.

On the head base 2, on the other hand, there is fixed a magnetic head H which is carried together in the direction of the arrow (A).

A pinch roller P facing the capstan 1 is held on a roller bracket 17. This bracket 17 is supported in a swingable manner on a pin 18. This pin 18 is anchored at the chassis 10 through both an escape hole 2b formed in the head base 2 and the escape hole of the drive plate. The roller bracket 17 is bent to form a spring hook portion 17a which mounts a coil spring 19 between itself and the bent portion 2a of the head base 2. By the elastic force of that coil spring 19, the roller bracket 17 is biased counter-clockwise, as viewed in FIG. 1. From the leading end of the lower portion of the roller bracket 17, on the other hand, there projects a lock arm 17b which has its leading portion bend downward. The leading end of this lock arm 17b is inserted, as shown in detail in FIG. 2, into an escape hole 10b of the chassis 10 through both an escape hole 2c of the head base and a regulating hole 12c of the drive plate 12. As has been described hereinbefore, the roller bracket 17 is biased counter-clockwise, as viewed in FIG. 1, by the coil spring 19 but is regulated from its counter-clockwise turns by having its lock arm 17b abutting against the front end of the regulating hole 12c of the drive plate 12.

Figure 3:
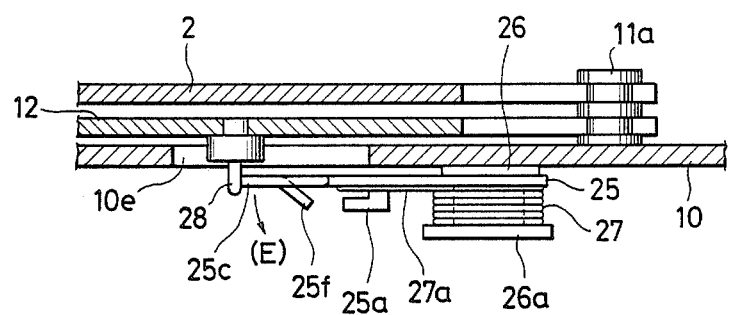
FIG. 3 is a section taken along line III—III of FIG. 1.
Figure 6:
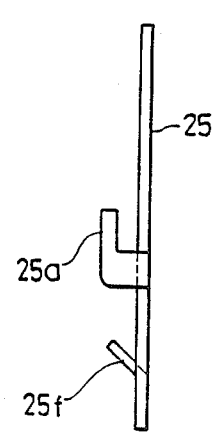
FIG. 6 is a side elevation showing a cam plate.
Figure 7:
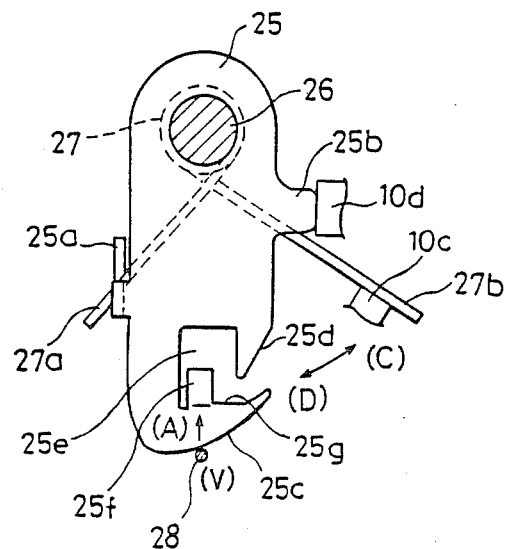
FIGS. 7, 8 and 9 are top plan views showing the cam plate but in different operation modes.

As shown in FIG. 3, the chassis 10 is equipped at its back side with a cam plate 25. FIG. 7 is a top plan view showing the shape of the cam plate 25, and FIG. 6 is a lefthand side elevation of the same. The cam plate 25 is supported to swing in the directions (i.e., the directions (C)-(D) of FIG. 7) of the chassis 10 by means of a hinge pin 26 which is anchored at the back of the chassis 10. The pin 26 is formed at its leading end with a flange 26a which mounts a spring 27 between itself and the cam plate 25. This spring 27 is sandwiched between the cam plate 25 and the flange 26a and has a function to cause them to repulse each other. From the spring 27, moreover, there extend two arms 27a and 27b one of which 27a is hooked from the outside on a spring hook 25a bent at the left end whereas the other arm 27b is hooked from the outside on a spring support 10c formed on the lower face of the chassis 10. By the elastic force of that spring 27, the cam plate 25 is biased in the direction of the arrow (C). The cam plate 25 is formed at its right end with a projection 25b which is adapted to abut against a stopper 10d formed on the lower face of the chassis 10 thereby to regulate the swinging range of the cam plate 25 in the direction (C). On the other hand, the spring 27 biases the cam plate 25 toward the chassis 10, as viewed in FIG. 3, but has its coiled portion contracted, when the cam plate 25 is pushed down in a direction (E), so that it can depress the cam plate 25 in the direction (E). When the force of the spring 27 in the direction (E) is released, the cam plate 25 is allowed to return toward the chassis 10.

As best shown in FIG. 7, the cam plate 25 has its major portions formed at its outermost end with a curve portion 25c and at its slightly inner portion with a sloped portion 25d. The cam plate 25 is formed in its inside with a cut-away portion 25e which merges into the sloped portion 25d. A guide portion 25f projects into that cut-away portion 25e. As shown in FIG. 6 (showing the side elevation of the cam plate), that guide portion 25f is bent obliquely apart from the chassis 10. The right end of the guide portion 25f forms a stopper portion 25g.

At the lower face of the drive plate 12, as shown in FIG. 3, there is anchored a control pin 28. This pin 28 extends through an escape hole 10e of the chassis 10 to the back of the chassis 10 to face the position where it engages with the cam plate 25.

Next, the operations of the tape player thus constructed will be described in the following.

FIG. 1 shows the stop state of the tape player. In this state, the motor M is interrupted, and the solenoid is in its deenergized state. As a result, the plunger Sa is not attracted to allow the drive plate 12 to be returned in the direction (B) by the force of the return spring 15. The head base 2 is also returned in the direction (B) by the retaining portion 12b located at the right end of the drive plate 12. At this time, the guide pin 11b on the chassis 10 functions as a stopper for defining the fully retracted position of the drive plate 12 and the head base 2 in the direction (B). In the stop state of FIG. 1, the magnetic head H is completely apart from the tape. Moreover, the lock arm 17b is returned in the direction (B) by the regulating hole 12c (which should be referred to FIG. 2) of the drive plate 12 so that the pinch roller P held on the roller bracket 17 is at a distance from the capstan 1.

In the stop state of the player, moreover, the control pin 28 anchored at the drive plate 12 is located in a position (V) shown in FIG. 7.

In the state of FIG. 1, incidentally, if the shaft of the motor M is rotated clockwise at a high speed, the idle gear 7a meshes with the follower gear 8a so that the reel base Ra is rotated clockwise at a high speed to effect the fast forward of the tape. If the shaft of the motor M is rotated counter-clockwise at a high speed, on the contrary, the reel base Rb is driven counter-clockwise to effect the rewind of the tape.

When the playing (or recording) operation is to be conducted, the solenoid S is energized from the stop state of FIG. 1 to attract the plunger Sa.

Figure 4:
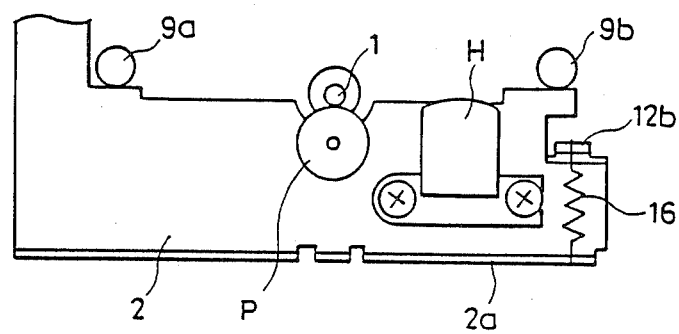
FIG. 4 is a schematic view showing a portion of the same for explaining the playing operation.

The drive plate 12 connected to the plunger Sa is pulled in the direction (A), and the head base 2 is also pulled in the direction (A) through the connecting spring 16 located at the right end of FIG. 1. As shown in FIG. 4, the head base 2 comes to stop at the position where it abuts against the positioning pins 9a and 9b. In this state, the magnetic head H is carried by the head base 2 to come into contact with the tape in the micro cassette. In the state where the plunger Sa of the solenoid S is attracted to its full stroke, the drive plate 12 is moved in the direction (A) further from the stop position of the head base 2, as shown in FIG. 4. Then, the end side (which should be referred to FIG. 2) of the regulating hole 12c of the drive plate 12 moves forward in the direction (A) so that it leaves the lock arm 17b to bring the pinch roller P into contact wit the capstan 1 through the tape by the force of the coil spring 19. If, at this time, the shaft of the motor M is rotated clockwise at a constant speed, the capstan 1 is rotated clockwise at a constant speed together with the flywheel 3 to feed the tape leftward of FIG. 1. At this time, moreover, the idle gear 7a comes into meshing engagement with the follower gear 8a to drive the reel base Ra clockwise so that the reel in the cassette is driven to wind up the tape. Then, the playing (or recording) operation is conducted by the magnetic head H.

Figure 8:
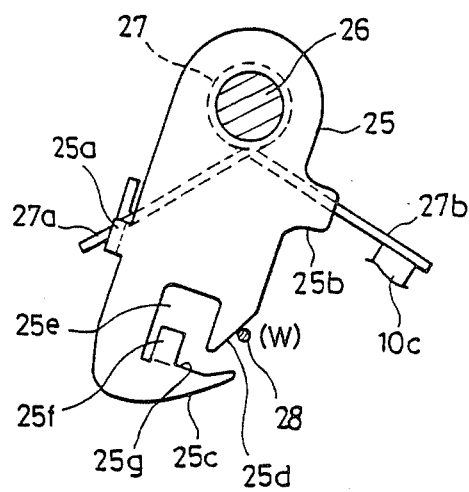

While the tape player has its operation transferred from the stop state to the playing state, as described above, the pin 28 anchored to the drive plate 12 is moved linearly in the direction (A) from the position (V) shown in FIG. 7. At this time, the pin 28 traces the curve portion 25c so that the cam plate 25 is turned in the direction (D) against the force of the spring 27. When the plunger Sa of the solenoid S is fully attracted to invite the playing (or recording) state, as shown in FIG. 8, the control pin 28 comes into a position (W) where it abuts against the sloped portion 25b. In this playing (or recording) state, the solenoid S is continuously energized so that the control pin 28 is held in the position of FIG. 8.

Next, in case the operation is to be transferred to the cue or review operation or the fast erasing operation, the solenoid S is is brought into its deenergized state from the playing (or recording) state.

Figure 2:
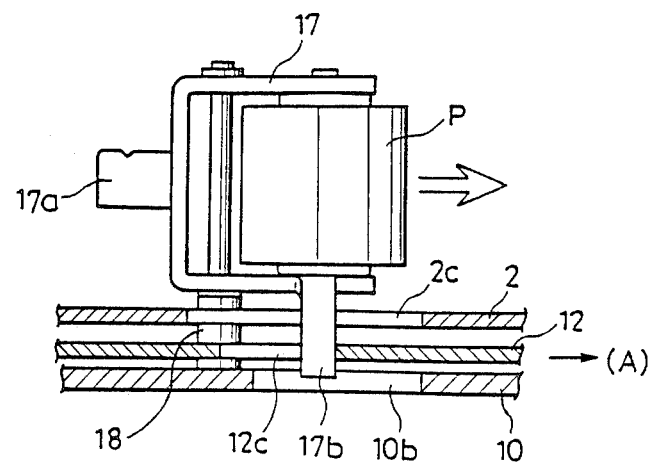
FIG. 2 is a section taken along line II—II of FIG. 1.
Figure 5:
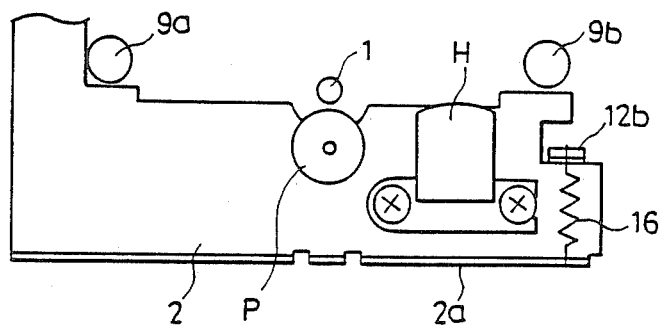
FIG. 5 is similar to FIG. 4 but for explaining the cue or review operation.
Figure 9:
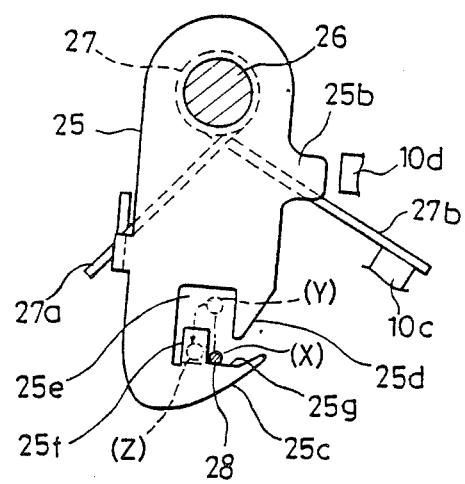

When the solenoid S is deenergized, the drive plate 12 is returned in the direction (B) by the action of the return spring 15, whereupon the control pin 28 carried on the drive plate 12 enters the cut-away portion 25e of the cam plate 25, as shown in FIG. 9, to come into the intermediate position (X) where it abuts against the stopper portion 25g. The pin 28 is regulated by this stopper portion 25g, the drive plate 12 is obstructed from returning further in the direction (B). In this state, the lock arm 17b is returned (as shown in FIG. 2) by the regulating hole 12c of the drive plate 12 so that the roller bracket 17 is turned to bring the pinch roller P slightly apart from the capstan 1. At the same time, the head base 2 is also returned slightly in the direction (B) by the retaining portion 12b so that the magnetic head H comes into light contact with the tape (as shown in FIG. 5). If the motor M is turned clockwise at a high speed, the capstan 1 and the reel base Ra are driven together clockwise at high speeds. Since the pinch roller P is apart from the capstan 1, this capstan 1 cannot apply its feeding force to the tape any more. As a result the tape is fed at a high speed by the reel base Ra so that it is headed by the magnetic head H. This is the cue operation mode. If the motor M is rotated counter-clockwise in the same state, the review operation is invited. More specifically, the tape is rewound at a high speed by the reel base Rb, whereupon it is also headed by the magnetic head H. If, moreover, the erasing operation is conducted by the magnetic head H in the same state as that of the cue or review operation, the fast erasure can be effected.

If the solenoid S is once energized and then deenergized from the cue, review or fast erasing operation mode, the stop state shown in FIG. 1 is restored.

If the solenoid S is once energized to move the drive plate 12 in the direction (A), more specifically, the pin is moved from the position (X) to the position (Y), as shown in FIG. 9. Then, the cam plate 25 is turned by the force of the spring 27 to the position where it abuts against the stopper 10d so that the guide portion 25f is positioned side by side with the control pin 28. If the solenoid S is deenergized, the pin 28 passes over the inclined guide portion 25f, as shown at (Z). At this time, the cam plate 25 escapes in the direction (E) of FIG. 3 so that the pin 28 is allowed to return to the position (V)

of FIG. 7. As a result, the drive plate 12 returns together with the control pin 28 in the direction (B), and the head base 2 also returns in the direction (B) to restore the stop position of FIG. 1.

Figure 10:
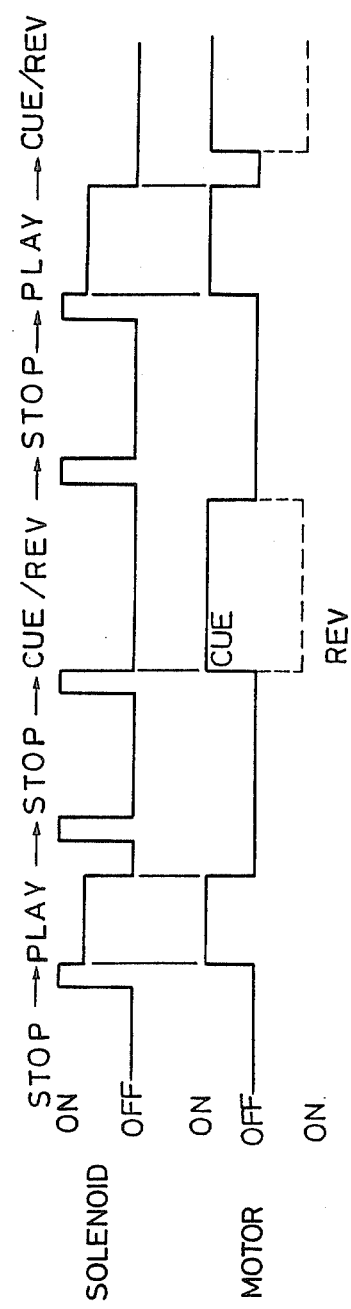
FIG. 10 is a time chart showing a motor and a solenoid.

FIG. 10 is a time chart showing the operations of the solenoid S and the motor M, which are rearranged for the respective operation modes. As shown, the playing (or recording) state (as shown in FIGS. 4 and 8) is obtained by energizing the solenoid S from the stop state (as shown in FIGS. 1 and 7), by dropping the supply voltage to maintain a continuous power supply state after a short time, and by rotating the motor M at a constant speed. If the solenoid S is once deenergized from the playing (or recording) state and is then energized for a short time until it is deenergized again, the operation instantly passes over the state of FIGS. 5 and 9 to restore the stop state. If, on the other hand, the solenoid S is energized for a short time from the stop state and is soon deenergized, the operation instantly passes over the state of FIGS. 4 and 8 to come to the state of FIGS. 5 and 9. If, at this time, the motor M is rotated at a high speed, the operation to be invited is either the cue or review operation or the fast erasing operation.

In the shown embodiment, incidentally, the cam mechanism is exemplified by disposing the cam plate 25 at the side of the chassis 10 and the control pin 28 at the side of the drive plate 12. Although the construction is slightly more complicated, however, the pin 28 may be disposed at the side of the chassis 10, and the cam plate 25 may be disposed at the side of the drive plate 12.

Moreover, similar operations can be attained even if a heart-shaped cam groove is formed in the chassis 20 or a cam plate having that cam groove is hinged to the chassis 10 and if a control pin for tracing that cam groove is anchored at the drive plate.

As has been described hereinbefore, according to the present invention, the operation can be switched to not only the playing or stopping mode but also the cue, review and fast erasing mode merely by repeating the attracting and non-attracting operations of the solenoid. In other words, even in the simplified, small-sized tape player having only one motor and one solenoid, the number of the operation modes can be increased merely by providing the simple cam mechanism. This makes it possible to realize the small-sized, multi-functioned tape player.

What is claimed is:

1. A tape player comprising:
   a chassis;
   a capstan rotatably supported on said chassis;
   a pair of reel bases mounted rotatably on said chassis for winding a tape of a tape cassette in one and the other directions;
   a prime mover for rotationally driving said capstan and said reel bases for winding the tape in one and the other directions;
   a head base supported slidably on said chassis;
   a magnetic head fixed on said head base which is movable with said head base to be placed in contact and displaced out of contact with the tape;
   a pinch roller movably supported on said chassis which is movable into and out of contact with said capstan for feeding the tape therebetween;
   a drive plate connected to said head base and said pinch roller which is slidably supported on said chassis for sliding movement between an engaged position, wherein said magnetic head is placed in contact with the tape and the pinch roller is in contact with the capstan for playing or recording operations, and a retracted position, wherein said head base is displaced out of contact with the tape and the pinch roller is out of contact with said capstan;
   a solenoid connected to said drive plate for moving said drive plate toward the engaged position when it is energized and for releasing said drive plate toward the retracted position when it is deenergized; and said chassis
   bias means connected between said drive plate and said chassis for biasing said drive plate to move toward the retracted position when said solenoid is deenergized,
   wherein the improvement comprises a cam mechanism actuated by the same said solenoid for holding and releasing said drive plate at an intermediate position between said engaged and said retracted positions, in which said magnetic head is in light contact with the tape and said pinch roller is slightly apart from said capstan for cue, review, or erasing operations, said cam mechanism including a cam plate supported on one of said drive plate and said chassis and an engaging member fixed on the other of said drive plate and said chassis, said cam plate having a stopper portion for holding said engaging member in the intermediate position when said solenoid if first deenergized after being energized to move said drive plate to said engaged position, and a guide portion for passing said engaging member and allowing said drive plate to be returned from said intermediate position to said retracted position by said bias means when said solenoid is subsequently energized and then deenergized.

2. A tape player according to claim 1, wherein said bias means includes a return spring mounted between said drive plate and said chassis for biasing said drive plate away from said solenoid.

3. A tape player according to claim 1, wherein said cam mechanism includes: a hinge pin hinging said cam plate to said chassis; said engaging member is a control pin made engageable with the cam plate for tracing the same to control the position of said drive plate relative to said cam plate; and a spring for biasing said cam plate toward said solenoid and said chassis.

4. A tape player according to claim 3, wherein said cam plate is mounted on a back side of said chassis whereas said control pin is anchored to said drive plate.

* * * * *